(12) United States Patent
Monden et al.

(10) Patent No.: US 11,460,139 B2
(45) Date of Patent: Oct. 4, 2022

(54) CLAMP

(71) Applicants: DENSO CORPORATION, Kariya (JP); Gomunoinaki Co., Ltd., Aichi (JP)

(72) Inventors: Junya Monden, Kariya (JP); Eisaku Takeuchi, Nagoya (JP)

(73) Assignees: DENSO CORPORATION, Kariya (JP); Gomunoinaki Co., Ltd., Aichi (JP)

( * ) Notice: Subject to any disclaimer, the term of this patent is extended or adjusted under 35 U.S.C. 154(b) by 0 days.

(21) Appl. No.: 17/228,328

(22) Filed: Apr. 12, 2021

(65) Prior Publication Data

US 2021/0231251 A1   Jul. 29, 2021

Related U.S. Application Data

(63) Continuation of application No. PCT/JP2019/040627, filed on Oct. 16, 2019.

(30) Foreign Application Priority Data

Oct. 25, 2018   (JP) .............................. JP2018-200753

(51) Int. Cl.
*F16L 55/02* (2006.01)
*F16B 2/10* (2006.01)
*F16L 3/10* (2006.01)
*F16L 3/237* (2006.01)

(52) U.S. Cl.
CPC ................ *F16L 55/02* (2013.01); *F16B 2/10* (2013.01); *F16L 3/1041* (2013.01); *F16L 3/1075* (2013.01); *F16L 3/237* (2013.01)

(58) Field of Classification Search
CPC ....... F16L 55/02; F16L 3/1041; F16L 3/1075; F16L 3/237; F16B 2/10
See application file for complete search history.

(56) References Cited

U.S. PATENT DOCUMENTS

| 2010/0025272 A1 | 2/2010 | Stau et al. |
| 2013/0001373 A1 | 1/2013 | Ogawa |
| 2013/0146720 A1* | 6/2013 | Meyers ................. F16L 55/035 248/68.1 |

FOREIGN PATENT DOCUMENTS

| CN | 106641455 A | * | 5/2017 | ............ F16L 55/035 |
| JP | 2003106479 A | * | 4/2003 | |
| JP | 201032052 | * | 2/2010 | |

(Continued)

*Primary Examiner* — Terrell L McKinnon
*Assistant Examiner* — Ding Y Tan
(74) *Attorney, Agent, or Firm* — Harness, Dickey & Pierce, P.L.C.

(57) ABSTRACT

There is provided a clamp for clamping an object from an outer side of the object to fix the object while the object has a cross-section with a circular outer periphery. The clamp includes: a hard segment that is made of a hard material and is shaped in a tubular form; and a soft segment that is made of a soft material and is located on an inner side of the hard segment. The soft segment includes: an arcuate portion which has an inner edge that is arcuate; and a plurality of projections which project inwardly from the arcuate portion and is configured to urge the object. Each of the plurality of projections has a relief hole that extends through the projection such that the relief hole has a shape that corresponds to an outer shape of the projection.

8 Claims, 5 Drawing Sheets

(56) References Cited

FOREIGN PATENT DOCUMENTS

| | | | | |
|---|---|---|---|---|
| JP | 201032052 | A | * | 2/2010 |
| JP | 2010032052 | A | | 2/2010 |
| JP | 4700868 | B2 | * | 6/2011 |
| JP | 2013143842 | | * | 7/2013 |
| JP | 5360498 | B2 | | 12/2013 |

* cited by examiner

CLAMP

CROSS REFERENCE TO RELATED APPLICATIONS

This application is a continuation application of International Patent Application No. PCT/JP2019/040627 filed on Oct. 16, 2019, which designated the U.S. and claims the benefit of priority from Japanese Patent Application No. 2018-200753 filed on Oct. 25, 2018. The entire disclosures of all of the above applications are incorporated herein by reference.

TECHNICAL FIELD

The present disclosure relates to a clamp for fixing an object that has a cross-section with a circular outer periphery.

BACKGROUND

A previously proposed clamp includes a cylindrical body formed by two concave members, and an arcuate buffer member is placed at an inner periphery of each of the concave members.

A tube body is held by the buffer members to hold and fix the tube body having a diameter within a predetermined allowable diameter range to damp vibrations of the tube body.

SUMMARY

This section provides a general summary of the disclosure, and is not a comprehensive disclosure of its full scope or all of its features.

According to one aspect of the present disclosure, there is provided a clamp for clamping an object from an outer side of the object to fix the object while the object has a cross-section with a circular outer periphery. The clamp includes a soft segment that is made of a soft material. The soft segment includes an arcuate portion and a plurality of projections. The plurality of projections project inwardly from the arcuate portion and are configured to urge the object. Each of the plurality of projections has a relief hole that extends through the projection.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

A previously proposed clamp includes a cylindrical body formed by two concave members, and an arcuate buffer member is placed at an inner periphery of each of the concave members.

A tube body is held by the buffer members to hold and fix the tube body having a diameter within a predetermined allowable diameter range to damp vibrations of the tube body.

In the above-described clamp, it is important to uniformly flex the buffer members in order to properly hold and fix the tube body.

However, in the above-described clamp, the buffer members may not be flexed uniformly for each of tube bodies that respectively have different diameters (in other words, objects to be fixed).

A clamp according to one aspect of the present disclosure includes a hard segment, which is made of a hard material and is shaped in a tubular form, and a soft segment, which is made of a soft material and is located on an inner side of the hard segment. The soft segment includes an arcuate portion, which has an inner edge that is arcuate, and a plurality of projections, which project inwardly from the arcuate portion and are configured to urge the object. Each of the plurality of projections has a relief hole that extends through the projection such that the relief hole has a shape that corresponds to an outer shape of the projection.

With the above configuration, even when the object, which has a relatively large diameter, is fixed, the entire projection can be flexibly deformed and flexed as uniformly as possible due to the presence of the relief hole in the projection. Therefore, each of different objects, which respectively have different diameters, can be properly fixed.

Figure 1:
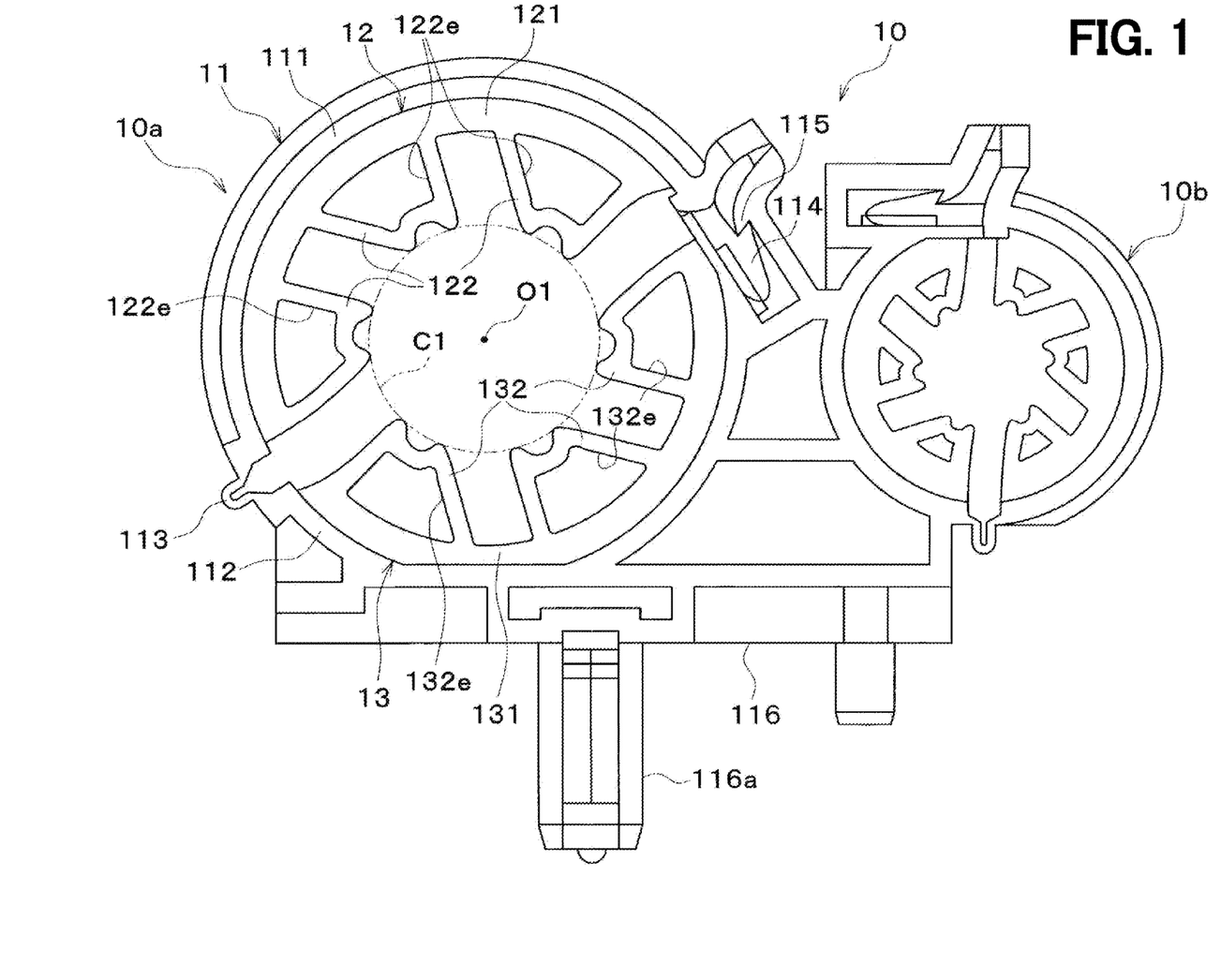
FIG. 1 is a front view showing a clamp according to an embodiment, indicating a state where the clamp is closed.

Hereinafter, an embodiment of the present disclosure will be described with reference to the drawings. A clamp 10 shown in FIG. 1 is configured to clamp a low-pressure refrigerant pipe and a high-pressure refrigerant pipe of a vehicle refrigeration cycle apparatus from an outer side of these pipes to fix the same. Specifically, objects to be fixed by the clamp 10 are the refrigerant pipes. The low-pressure refrigerant pipe and the high-pressure refrigerant pipe are made of metal (e.g., an aluminum alloy).

The clamp 10 includes a low-pressure side clamp 10*a* and a high-pressure side clamp 10*b*, which are formed in one-piece. The low-pressure side clamp 10*a* fixes the low-pressure refrigerant pipe. The high-pressure side clamp 10*b* fixes the high-pressure refrigerant pipe.

A diameter of the high-pressure refrigerant pipe is smaller than a diameter of the low-pressure refrigerant pipe so that the high-pressure side clamp 10*b* is smaller than the low-pressure side clamp 10*a*. However, a basic structure of the high-pressure side clamp 10*b* is substantially the same as that of the low-pressure side clamp 10*a*. Therefore, in the following description, a detailed configuration of the low-pressure side clamp 10*a* will be described, and a detailed configuration of the high-pressure side clamp 10*b* will be omitted.

The low-pressure side clamp 10*a* includes a hard segment 11, a first soft segment 12, and a second soft segment 13. The hard segment 11 is made of a hard material, such as a hard resin (for example, polyacetal resin, polyamide resin, etc.), and is shaped in a tubular form. The first soft segment 12 and the second soft segment 13 are made of a soft material (a material softer than the hard material) such as a soft resin (for example, a thermoplastic elastomer, etc.). The first soft segment 12 and the second soft segment 13 may be collectively referred to as a soft segment. The clamp 10 is formed such that the hard segment 11, the first soft segment 12, and the second soft segment 13 are molded in one-piece by double molding.

The hard segment 11 has a first semicircular portion 111, a second semicircular portion 112, a hinge 113, a male-coupler 114, a female-coupler 115, and a pedestal 116.

Each of the first semicircular portion 111 and the second semicircular portion 112 is shaped in a substantially semicircular form in a front view. Each of the first semicircular portion 111 and the second semicircular portion 112 is shaped in a substantially semicylindrical form having a predetermined thickness.

A thickness of the hinge 113 is smaller than a thickness of each of the first semicircular portion 111 and the second semicircular portion 112 to enable bending and expansion of the hinge 113. The male-coupler 114 is shaped like a claw so that the male-coupler 114 can be inserted into and coupled with the female-coupler 115.

At the time of closing the low-pressure side clamp 10a, the hinge 113 is bent, and the male-coupler 114 is coupled with the female-coupler 115. Therefore, the first semicircular portion 111 and the second semicircular portion 112 are combined and are fixed together to have a substantially circular form in a plan view. Specifically, when the first semicircular portion 111 and the second semicircular portion 112 are combined, the combination of the first semicircular portion 111 and the second semicircular portion 112 constitutes a substantially cylindrical tubular form as a three-dimensional form.

Figure 2:
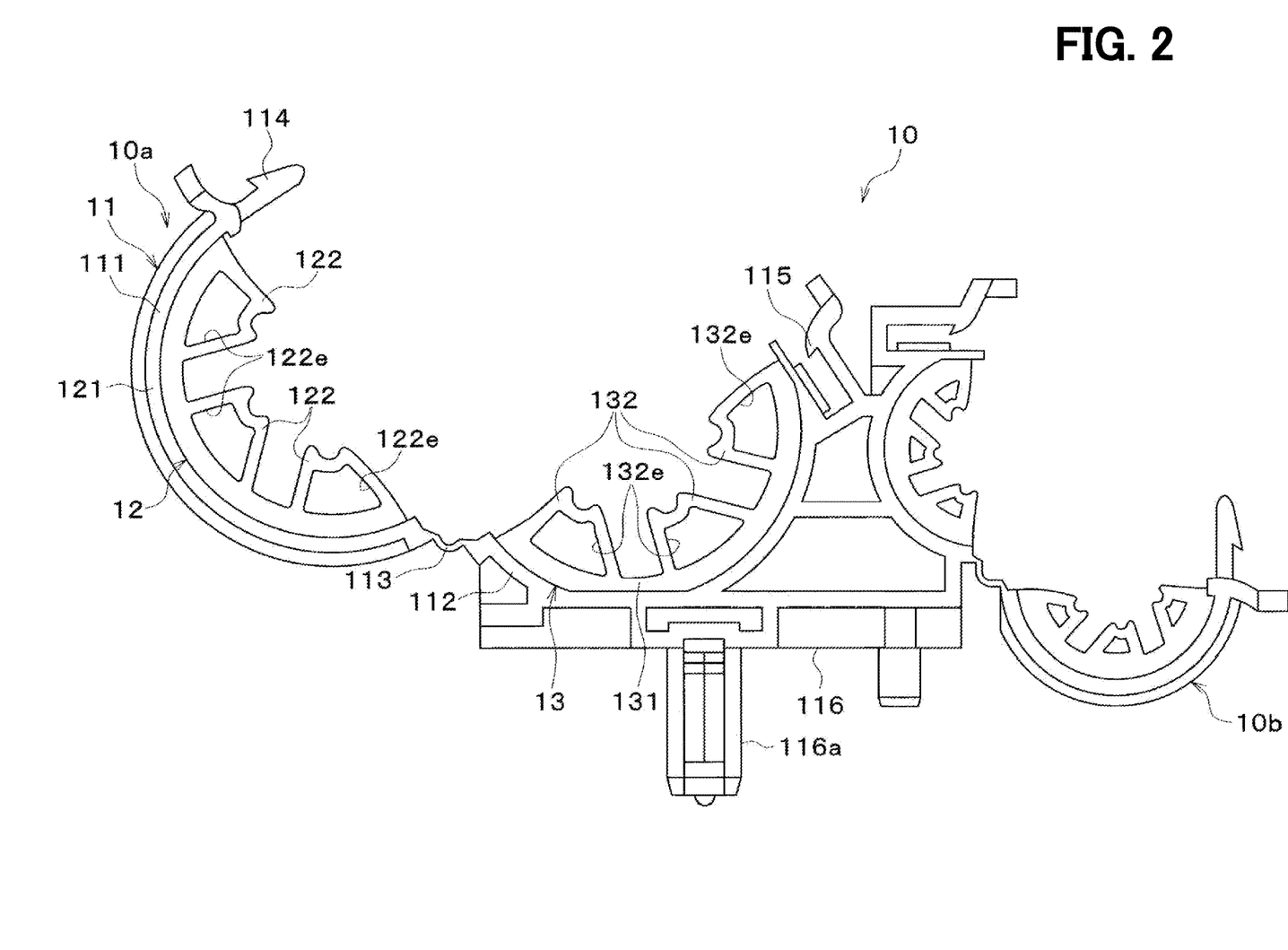
FIG. 2 is a front view showing the clamp according to the embodiment, indicating another state where the clamp is opened.

FIG. 2 indicates a state where the male-coupler 114 is not coupled to the female-coupler 115. Specifically, FIG. 2 indicates a state where the hinge 113 is expanded, and the first semicircular portion 111 and the second semicircular portion 112 are opened.

The pedestal 116 has an insertion pin 116a. When the insertion pin 116a is inserted into a hole of a vehicle body (not shown), the clamp 10 is fixed to the vehicle body.

Each of the first soft segment 12 and the second soft segment 13 is shaped in a substantially semi-arc form in a front view. The first soft segment 12 is located on an inner side of the first semicircular portion 111. The second soft segment 13 is located on an inner side of the second semicircular portion 112.

When the hinge 113 of the hard segment 11 is bent, the first soft segment 12 and the second soft segment 13 are opposed to each other and constitute a substantially cylindrical form.

Each of the first soft segment 12 and the second soft segment 13 has an arcuate portion 121, 131 and a plurality of projections 122, 132.

The arcuate portion 121, 131 has an inner edge that is arcuate. When the first soft segment 12 and the second soft segment 13 are opposed to each other after bending of the hinge 113 of the hard segment 11, the arcuate portions 121, 131 are combined and constitute a substantially circular form.

The projections 122, 132 project inwardly from the arcuate portion 121, 131 (i.e., the projections 122, 132 project toward a center of the arc). The projections 122, 132 are configured to urge the low-pressure refrigerant pipe. The projections 122, 132 are arranged at about 60 degree intervals in a circumferential direction of the arcuate portion 121, 131.

Figure 3:
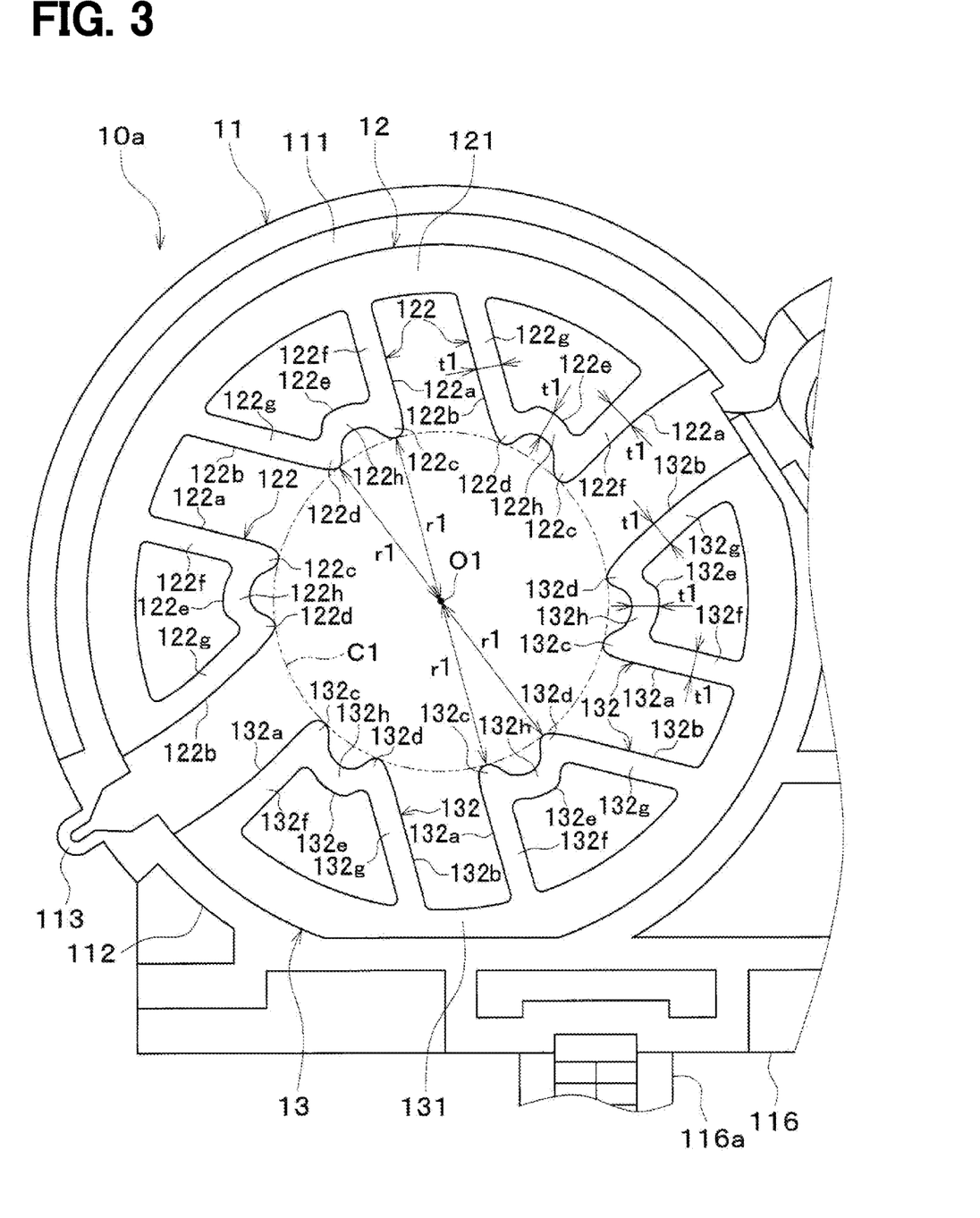
FIG. 3 is an enlarged view of a low-pressure side clamp shown in FIG. 1.

Each projection 122, 132 is shaped in a substantially circular sector form in a front view. As shown in FIG. 3, each projection 122, 132 has a couple of straight edge portions 122a, 122b, 132a, 132b. In each projection 122, 132, one of the couple of straight edge portions 122a, 122b, 132a, 132b, which is located on the front side in the clockwise direction in FIG. 3, extends from the arcuate portion 121, 131 toward the clamp center O1 (i.e., the one straight edge portion 122a, 132a extends in a corresponding radial direction which extends from a base of the one straight edge portion 122a, 132a to the clamp center O1).

The clamp center O1 is the center of the circle that is formed when the first semicircular portion 111 and the second semicircular portion 112 are combined to constitute the substantially circular form. In other words, the clamp center O1 is the center of the circle that is formed when the arcuate portion 121, 131 are combined together in the substantially circular form.

The other one of the couple of straight edge portions 122a, 122b, 132a, 132b, which is located on the rear side in the clockwise direction in FIG. 3, extends from the arcuate portion 121, 131 toward a point located in front of the clamp center O1 (i.e., the other straight edge portion 122b, 132b is circumferentially tilted toward the one straight edge portion 122a, 132a relative to a corresponding radial direction which extends from a base of the other straight edge portion 122b, 132b to the clamp center O1).

A couple of lips 122c, 122d, 132c, 132d is formed at a distal end (radially inner end) of each of the projections 122, 132. Each of the lips 122c, 122d, 132c, 132d is configured to tightly contact the low-pressure refrigerant pipe.

A distance from the clamp center O1 to each of the lips 122c, 122d, 132c, 132d is equally set for the lips 122c, 122d, 132c, 132d. Hereinafter, the distance from the clamp center O1 to the lip 122c, 122d, 132c, 132d will be referred to as a lip radius r1.

In other words, a distal end of each of the lips 122c, 122d, 132c, 132d is located on an imaginary circle C1 that is concentric with the inner edges of the arcuate portions 121, 131.

Each of the projections 122, 132 has a relief hole 122e, 132e. The relief hole 122e, 132e extends through the projection 122, 132 in an axial direction of the low-pressure side clamp 10a (a direction perpendicular to a plane of each of FIGS. 1 to 3).

The relief hole 122e, 132e has a shape that corresponds to an outer shape of the projection 122, 132. Specifically, the relief hole 122e, 132e is shaped in a substantially circular sector form.

A radially outer edge (also simply referred to as an outer edge) of the relief hole 122e, 132e is located on an extension of the inner edge of the arcuate portion 121, 131. The radially outer edge of the relief hole 122e, 132e is arcuate, and this radially outer edge is concentric with the inner edge of the arcuate portion 121, 131 and has a radius of curvature which is equal to a radius of curvature of the inner edge of the arcuate portion 121, 131.

Therefore, each projection 122, 132 is roughly divided into three portions, i.e., a pair of side portions 122f, 122g, 132f, 132g, and a distal end portion 122h, 132h. The pair of side portions 122f, 122g, 132f, 132g are respectively located on two opposite sides of the relief hole 122e, 132e in the circumferential direction and extend in a generally radial direction of the low-pressure clamp 10a. The distal end portion 122h, 132h is located on a distal end side of the relief hole 122e, 132e in the radial direction and extends in a generally circumferential direction of the low-pressure clamp 10a.

The couple of side portions 122f, 122g, 132f, 132g and the distal end portion 122h, 132h have a wall thickness that is equally set for the couple of side portions 122*f*, 122*g*, 132*f*, 132*g* and the distal end portion 122*h*, 132*h*. The wall thickness of these portions will be hereinafter referred to as a projection wall thickness t1. However, the wall thickness of the couple of lips 122*c*, 122*d*, 132*c*, 132*d* is slightly larger than the projection wall thickness t1 for molding convenience.

There is satisfied a relationship of 6.4%≤a≤9.6% where a is a value which is obtained by dividing the projection wall thickness t1 by the lip radius r1 (i.e., a=t1/r1).

One of the couple of side portions 122*f*, 122*g*, 132*f*, 132*g*, which is located on the front side in the clockwise direction in FIG. 3, extends from the arcuate portion 121, 131 toward the clamp center O1 (i.e., the one side portion 122*f*, 132*f* extends in a corresponding radial direction which extends from a base of the one side portion 122*f*, 132*f* to the clamp center O1).

The other one of the couple of side portions 122*f*, 122*g*, 132*f*, 132*g*, which is located on the rear side in the clockwise direction in FIG. 3, extends from the arcuate portion 121, 131 toward the point located in front of the clamp center O1 (i.e., the other side portion 122*g*, 132*g* is circumferentially tilted toward the one side portion 122*f*, 132*f* relative to a corresponding radial direction which extends from a base of the other side portion 122*g*, 132*g* to the clamp center O1).

Figure 4:
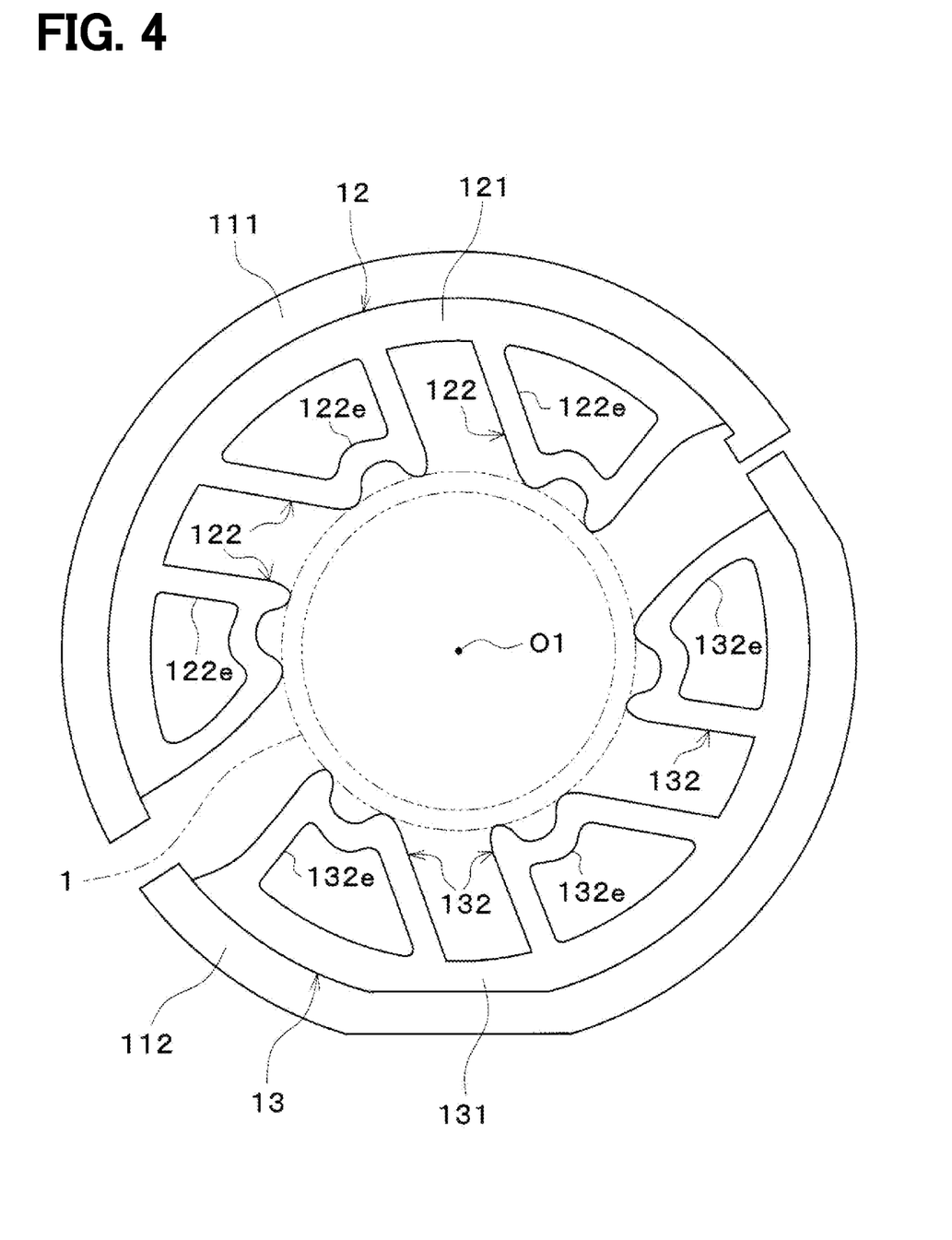
FIG. 4 is a front view showing a deformed state of projections when the low-pressure side clamp of FIG. 1 fixes a low-pressure refrigerant pipe having a predetermined diameter.
Figure 5:
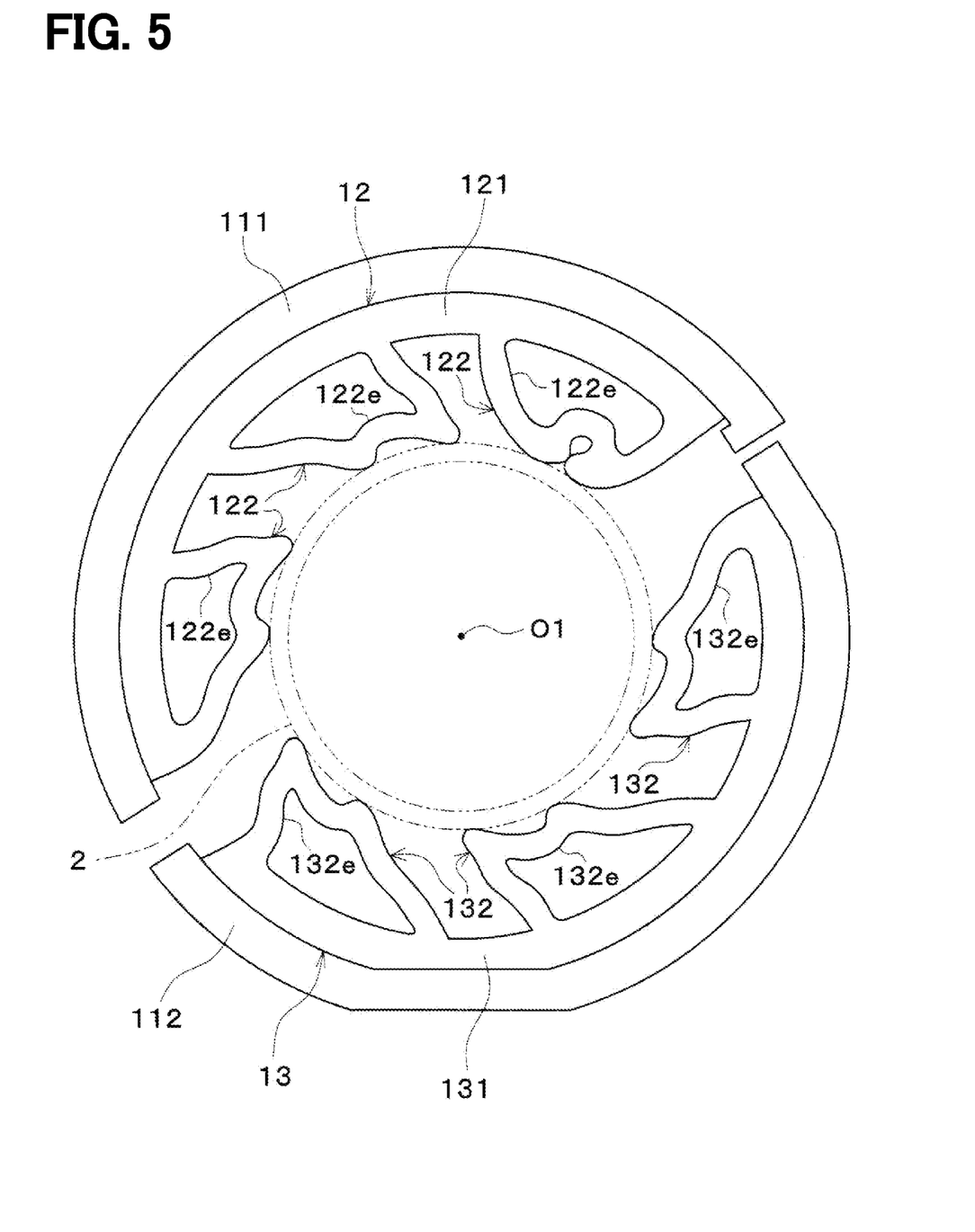
FIG. 5 is a front view showing another deformed state of the projections when the low-pressure side clamp of FIG. 1 fixes a low-pressure refrigerant pipe having a relatively large diameter.

Next, the effects and advantages of the above-described configuration will be described with reference to FIGS. 4 and 5. FIG. 4 indicates a deformed state of the projections 122, 132 when the low-pressure side clamp 10*a* fixes a low-pressure refrigerant pipe 1. The low-pressure refrigerant pipe 1 of FIG. 4 has a radius that is slightly larger than the lip radius r1 of FIG. 3. In other words, the low-pressure refrigerant pipe 1 has a diameter that is slightly larger than a diameter of the imaginary circle C1 of FIG. 3. FIG. 5 indicates another deformed state of the projections 122, 132 when the low-pressure side clamp 10*a* fixes a low-pressure refrigerant pipe 2. The low-pressure refrigerant pipe 2 of FIG. 5 has a diameter that is larger than the diameter of the low-pressure refrigerant pipe 1 of FIG. 4.

As shown in FIGS. 4 and 5, when the low-pressure side clamp 10*a* fixes the low-pressure refrigerant pipe 1, 2, the projections 122, 132 of the low-pressure side clamp 10*a* are deformed such that the projections 122, 132 are all leaned in the same direction.

Specifically, the projections 122, 132 are deformed such that the projections 122, 132 are all leaned in the clockwise direction (the common circumferential direction) in FIGS. 4 and 5. This is because of that among the pair of side portions 122*f*, 122*g*, 132*f*, 132*g*, the one side portion 122*f*, 132*f*, which is located on the front side in the clockwise direction in FIG. 3, extends toward the clamp center O1 (i.e., the one side portion 122*f*, 132*f* extends in the corresponding radial direction toward the clamp center O1), and the other side portion 122*g*, 132*g*, which is located on the rear side in the clockwise direction in FIG. 3, extends toward the point located in front of the clamp center O1 (i.e., the other side portion 122*g*, 132*g* is circumferentially tilted toward the one side portion 122*f*, 132*f* relative to the corresponding radial direction which extends from the base of the other side portion 122*g*, 132*g* to the clamp center O1).

Since the low-pressure refrigerant pipe 2 of FIG. 5 has the diameter that is larger than the diameter of the low-pressure refrigerant pipe 1 of FIG. 4, the projections 122, 132 will be deformed in the greater amount in the case where the low-pressure refrigerant pipe 2 of FIG. 5 is fixed in comparison to the case where the low-pressure refrigerant pipe 1 of FIG. 4 is fixed.

Since the relief hole 122*e*, 132*e* is formed in each of the projections 122, 132, the entire projections 122, 132 can be flexibly deformed to properly fix the low-pressure refrigerant pipe 2 even in the case where the low-pressure refrigerant pipe 2, which has the relatively large diameter, is fixed.

Therefore, each of the low-pressure refrigerant pipes, which have the different diameters, can be properly fixed. In other words, a relatively wide diameter range of the fixable low-pressure refrigerant pipe can be ensured.

In the present embodiment, each of the plurality of projections 122, 132 has the relief hole 122*e*, 132*e* that extends through the projection 122, 132 such that the relief hole 122*e*, 132*e* has the shape that corresponds to the outer shape of the projection 122, 132.

With this feature, even when the low-pressure refrigerant pipe 2, which has the relatively large diameter, is fixed, the entire projection 122, 132 can be flexibly deformed and flexed as uniformly as possible due to the presence of the relief hole 122*e*, 132*e* in the projection 122, 132. Therefore, each of the low-pressure refrigerant pipes 1, 2, which have the different diameters, can be properly fixed.

In the present embodiment, in each of the projections, 122, 132, the relief hole 122*e*, 132*e* has the outer edge (radially outer edge) that is arcuate, and the outer edge of the relief hole 122*e*, 132*e* is coaxial with the inner edge of the arcuate portion 121, 131 and has the radius of curvature which is equal to the radius of curvature of the inner edge of the arcuate portion 121, 131.

With this feature, even in the case where the low-pressure refrigerant pipe 2, which has the relatively large diameter, is fixed, the entire projection 122, 132 can be further flexibly deformed due to the presence of the relief hole 122*e*, 132*e*.

In the present embodiment, in each of the projections, 122, 132, the couple of side portions 122*f*, 122*g*, 132*f*, 132*g* and the distal end portion 122*h*, 132*h* have the wall thickness t1 that is equally set for the couple of side portions 122*f*, 122*g*, 132*f*, 132*g* and the distal end portion 122*h*, 132*h*.

With this feature, even in the case where the low-pressure refrigerant pipe 2, which has the relatively large diameter, is fixed, the couple of side portions 122*f*, 122*g*, 132*f*, 132*g* and the distal end portion 122*h*, 132*h* of the projection 122, 132 can be flexibly deformed as uniformly as possible due to the presence of the relief hole 122*e*, 132*e*.

In the present embodiment, the distal end of the lip 122*c*, 122*d*, 132*c*, 132*d* of each of the plurality of projections 122, 132 is located along the imaginary circle C1 that is coaxial with the inner edge of the arcuate portion 121, 131. There is satisfied the relationship of 6.4%≤a≤9.6% where a is the value which is obtained by dividing the projection wall thickness t1 by the radius r1 of the imaginary circle C1.

With this feature, the projections 122, 132 can be properly deformed for the low-pressure refrigerant pipes, which respectively have the different diameters.

The present disclosure should not be limited to the above-described embodiment, and can be variously modified as follows without departing from the spirit of the present disclosure.

In the above embodiment, in the low-pressure side clamp 10*a*, the first soft segment 12 and the second soft segment 13 are molded together with the hard segment 11 in one-piece by the double molding. Alternatively, the first soft segment 12 and the second soft segment 13 may be molded separately from the hard segment 11 and fixed to the hard segment 11.

In the above embodiment, the clamp 10 fixes the refrigerant pipe. Alternatively, the clamp 10 may fix any one of various other types of members (e.g., a hollow cylindrical member a solid cylindrical member or the like) that has a cross-section with a circular outer periphery.

The material of the member, which is fixed by the clamp 10, should not be limited to the metal. That is, the member (object) to be fixed may be any one of various hard members (e.g., a member made of resin or the like).

Although the present disclosure has been described in accordance with the embodiment, it should be understood that the present disclosure is not limited to the embodiment and the structures described therein. The present disclosure also covers various other embodiments and modifications within a range of equivalence. In addition, various combinations and forms, as well as other combinations and forms that include only one element, more, or less of the above-described embodiment and modifications, are also within the scope of the present disclosure.

What is claimed is:

1. A clamp for clamping an object from an outer side of the object to fix the object while the object has a cross-section with a circular outer periphery, the clamp comprising:
    a hard segment that is made of a hard material and is shaped in a tubular form; and
    a soft segment that is made of a soft material and is located on an inner side of the hard segment, wherein:
    the soft segment includes:
        an arcuate portion which has an inner edge that is arcuate; and
        a plurality of projections which project inwardly from the arcuate portion and are configured to urge the object;
    each of the plurality of projections has a relief hole that extends through the projection such that the relief hole has a shape that corresponds to an outer shape of the projection;
    each of the plurality of projections has a first side portion and a second side portion that project from the inner edge of the arcuate portion and are respectively located on a first circumferential side and a second circumferential side of the relief hole of the projection which are opposite to each other in a circumferential direction of the arcuate portion; and
    at each of the plurality of projections, an angle of a center line of the first side portion relative to a straight line, which connects between two circumferentially opposite end points of an arc of the inner edge of the arcuate portion within the relief hole of the projection, is larger than an angle of a center line of the second side portion relative to the straight line.

2. The clamp according to claim 1, wherein in each of the plurality of projections, the relief hole has an outer edge that is arcuate, and the outer edge of the relief hole is coaxial with the inner edge of the arcuate portion and has a radius of curvature which is equal to a radius of curvature of the inner edge of the arcuate portion.

3. The clamp according to claim 1, wherein:
    each of the plurality of projections has
        a distal end portion which is located on a distal end side of the relief hole of the projection; and
    the first side portion, the second side portion and the distal end portion of each of the plurality of projections have a wall thickness that is equally set for the first side portion, the second side portion and the distal end portion of each of the plurality of projections.

4. The clamp according to claim 3, wherein:
    each of the plurality of projections has a lip that is configured to contact the object;
    a distal end of the lip of each of the plurality of projections is located along an imaginary circle that is coaxial with the inner edge of the arcuate portion; and
    there is satisfied a relationship of 6.4%≤α≤9.6% where α is a value which is obtained by dividing the wall thickness by a radius of the imaginary circle.

5. The clamp according to claim 1, wherein each of the plurality of projections has:
    first and second lips, a distal end of each of which is located along an imaginary circle that is coaxial with the inner edge of the arcuate portion; and
    a recess, which is circumferentially located between the first and second lips and is radially outwardly recessed from the imaginary circle toward the inner edge of the arcuate portion.

6. The clamp according to claim 1, wherein the first side portion and the second side portion of adjacent projections which are opposite to each other in a circumferential direction of the arcuate portion are substantially parallel to each other.

7. The clamp according to claim 1, wherein a space formed between the first side portion and the second side portion of adjacent projections which are opposite to each other in a circumferential direction of the arcuate portion is generally rectangular in shape.

8. The clamp according to claim 1, wherein the outer shape of each of the plurality of projections and the shape of each of the corresponding relief holes are generally trapezoidal.

* * * * *